P. & A. HURST.
Improvement in Bee-Hives.
No. 128,883. Patented July 9, 1872.
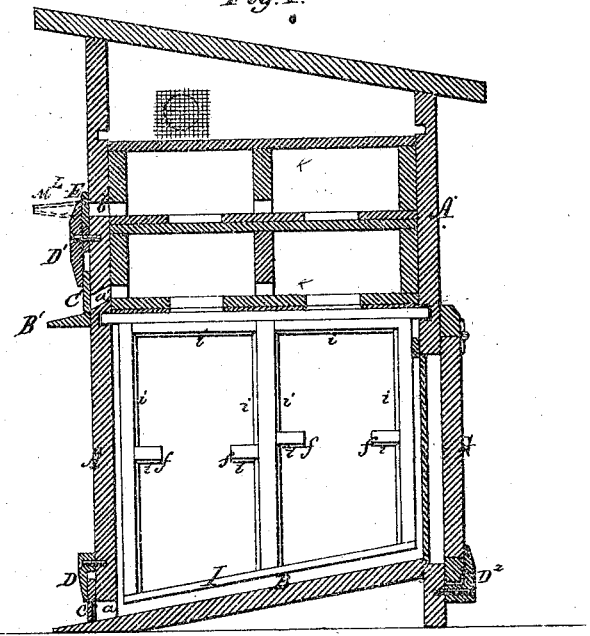
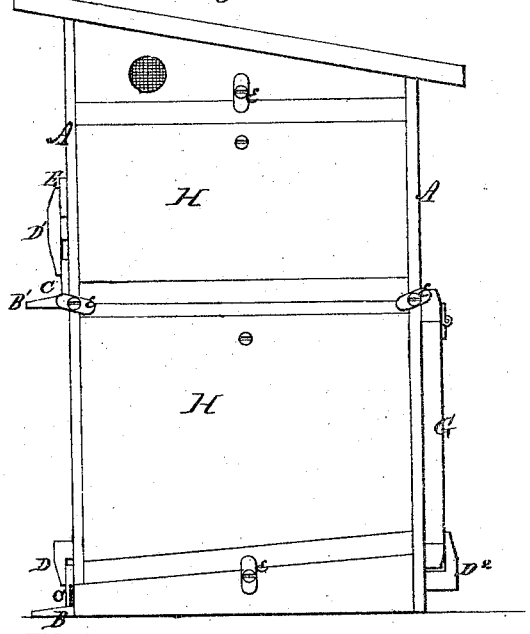
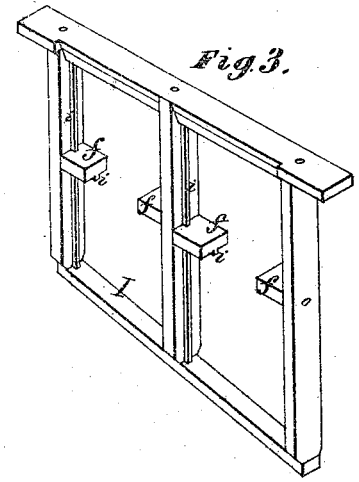
Witnesses
John A. Ellis
Wm. K. Ellis
Inventors
Peter Hurst & Amos Hurst,
Per
F. H. Alexander
Atty.

P. & A. HURST.
Improvement in Bee-Hives.
No. 128,883.  Patented July 9, 1872.
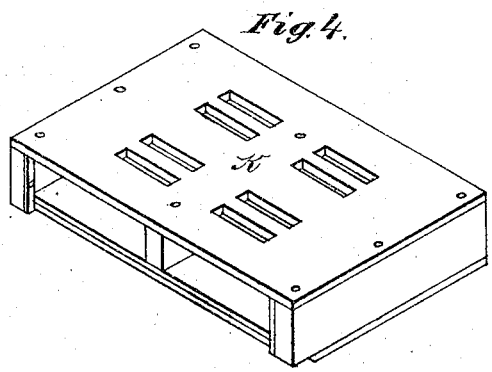
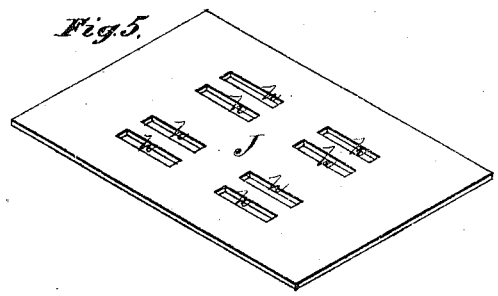
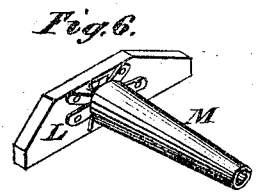

UNITED STATES PATENT OFFICE.

PETER HURST AND AMOS HURST, OF ORRVILLE, OHIO.

IMPROVEMENT IN BEE-HIVES.

Specification forming part of Letters Patent No. 128,883, dated July 9, 1872.

SPECIFICATION.

*To all whom it may concern:*

Be it known that we, PETER HURST and AMOS HURST, of Orrville, in the county of Wayne and State of Ohio, have invented certain new and useful Improvements in Bee-Hives; and we do hereby declare that the following is a full, clear, and exact description thereof, reference being had to the accompanying drawing and to the letters of reference marked thereon which form a part of this specification.

The nature of our invention consists in the construction and arrangement of a "bee-hive," as will be hereinafter more fully set forth.

In order to enable others skilled in the art to which our invention appertains to make and use the same, we will now proceed to describe its construction and operation, referring to the annexed drawing, in which—

Figure 1 is a longitudinal vertical section of the entire hive. Fig. 2 is a side elevation of the same. Fig. 3 is a perspective view of one of the comb-frames. Fig. 4 is a perspective view from the under side of one of the honey-boxes. Fig. 5 is a perspective view of the dividing-board; and Fig. 6 is a perspective of a board with tube, to be used at certain times.

A represents the body of the hive provided at the front side with two alighting-boards—one, B, for the lower or brood-chamber, and the other, $B^1$, for the honey-chamber. $a$ is the entrances to the brood-chamber, which may be covered by a slide, C, having wire-cloth-covered openings to correspond with the entrances $a$, and fastened by a button, D. Above the upper alighting-board $B^1$ is an entrance, $a'$, leading into the honey-chamber, which entrance, when not needed, is closed by a board, $C^1$, fastened by a button, $D^1$. This button also fastens a board, E, closing a smaller opening, $b$, the use of which will be hereinafter described. On the back of the hive A is a door, G, hinged at the upper edge, and fastened at the lower edge by a button, $D^2$, which door may be opened at any time to look into the brood-chamber, the opening being covered on the inside with a glass, $d$. One entire side of the hive consists of two removable panels or doors, H H, fastened by buttons $e$ $e$, as shown in Fig. 2. The comb-frames I I consist each of a top-bar, three upright-bars, and a bottom-bar, the latter inclined to correspond with the inclination of the bottom of the hive. The top bars have openings across them, as shown in Fig. 3. The upright bars have short comb-supporters $f$ $f$ attached about the middle of each upright. On the inside of the upright bars and bottom of the top bars and of the comb-supporters are ridges $i$ $i$; or grooves will answer the same purpose. The top bars of the frames are level, and on the same is laid a tin or thin board, J, fitting tight on the same, and forming the honey-chamber floor. Through this board are two rows of openings, $h$ $h$, to admit bees to the honey-boxes K K. The bees may be admitted into the honey-boxes both through the entrance $a'$ and also from the inside of the lower chamber, which is of great advantage to the bees. A tin slide is to be used to cut off communication between the lower chamber and the honey-boxes until the lower part is filled, when said tin slide is to be removed to admit the bees to the honey-boxes. Should they refuse to enter the boxes the lower entrance $a$ may be closed with the screen-board C, thus compelling the bees to enter through the passage $a'$, or pass through the honey-boxes to find their way out. This plan compels the bees to work in the honey-boxes after they have filled the lower chamber. When they have filled the first tier of boxes the tin slide is put in to cut off the bees from honey-boxes and lower chamber. Take the full boxes out and place the empty ones in; then take the slide out and it is ready to work; then place the full boxes on top of the empty ones. The bees in the full boxes, now on top, will pass out through the opening $b$, over which is first placed a board, L, with a tube, M, in place of the board E. The bees will pass out through said tube, but will not enter it again. When they are all out replace the board E, when the honey in the full boxes will be secured from insects.

Having thus fully described our invention, what we claim as new, and desire to secure by Letters Patent, is—

The removable board L provided with tube M, and used in combination with a bee-passage, *b*, opposite the upper tier of boxes in the honey-chamber of a bee-hive having two or more of such tiers, substantially as and for the purposes herein set forth.

In testimony that we claim the foregoing as our own we affix our signatures in presence of two witnesses.

PETER HURST
AMOS HURST.

Witnesses:
M. C. RORICH,
H. M. WILSON.